US008615330B2

(12) United States Patent
Dong et al.

(10) Patent No.: US 8,615,330 B2
(45) Date of Patent: Dec. 24, 2013

(54) METHOD AND APPARATUS FOR PROCESSING POWER SYSTEM TOPOLOGY STRUCTURE INFORMATION

(75) Inventors: Jin Dong, Beijing (CN); Feng Jin, Beijing (CN); Hai Rong Lv, Beijing (CN); Qi Ming Tian, Beijing (CN); Wen Jun Yin, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 12/915,293

(22) Filed: Oct. 29, 2010

(65) Prior Publication Data
US 2011/0106323 A1 May 5, 2011

(30) Foreign Application Priority Data
Oct. 30, 2009 (CN) .......................... 2009 1 0211382

(51) Int. Cl.
*G06F 1/26* (2006.01)
(52) U.S. Cl.
USPC ........................................... 700/286; 700/292
(58) Field of Classification Search
USPC .................................. 700/286, 292, 293, 295
See application file for complete search history.

(56) References Cited

U.S. PATENT DOCUMENTS

| 5,568,399 | A * | 10/1996 | Sumic ........................... 700/293 |
| 7,308,370 | B2 | 12/2007 | Mason |
| 7,562,024 | B2 | 7/2009 | Brooks |
| 2002/0103655 | A1 * | 8/2002 | Boies et al. ........................ 705/1 |
| 2004/0158360 | A1 | 8/2004 | Garland, II |
| 2004/0236620 | A1 | 11/2004 | Chauhan |
| 2006/0055549 | A1 | 3/2006 | Fischer |
| 2008/0183339 | A1 | 7/2008 | Vaswani |
| 2010/0076835 | A1 * | 3/2010 | Silverman ................... 705/14.33 |

FOREIGN PATENT DOCUMENTS

| CN | 1738143 | 2/2006 |
| CN | 101499658 A | 8/2009 |

OTHER PUBLICATIONS

"Electricity supply—power system management Coordinate power system outages." New Zealand Qualifications Authority 2010. http://www.nzga.govt.nz/nqfdocs/units/pdf/15568.pdf.
"Northwest Power Pool Area Assessment of Reliability and Adequacy 2009 Summer Operating Conditions". http://www.nwpp.org/pdf/SummerAssessment%202009%20Draft%203.pdf.
Al Garcia, "Annex P Power Outages". http://wvvw.sanjoseca.gov/emergencyServicesipdf/ANNEX_P.pdf.
"Empowering Consumers Through a Modern Electric Grid". Illinois Smart Grid Initiative. http://www.cnt.org/repository/ISGI.FinalReport.pdf.
"The Path to Perfect Power,New Technologies Advance Consumer Control", Galvin Electricity Initiative, Jan. 2007.
"Long Island Power Authority Draft Electric Resource Plan 20092018", Jun. 11, 2009. http://www.lipower.orolpdfs/company/projects/energyplan09/energyplan09-a.pdf.

* cited by examiner

*Primary Examiner* — Charles Kasenge
(74) *Attorney, Agent, or Firm* — Gail H. Zarick; Otterstedt, Ellenbogen & Kammer, LLP

(57) ABSTRACT

A topology structure of a power system is acquired. At least one unification set in the power system is identified based on the topology structure. Devices belonging to the same unification set have the same outage state. The at least one unification set is recorded, so as to concurrently maintain devices belonging to the same unification set. Advantageously, one or more embodiments reduce number of outages caused by power system device maintenance.

17 Claims, 3 Drawing Sheets

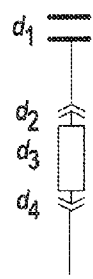
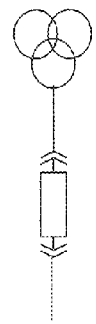
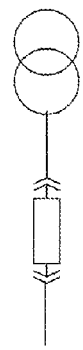
FIG. 3A  FIG. 3B  FIG. 3C
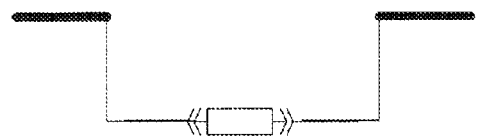
FIG. 3D
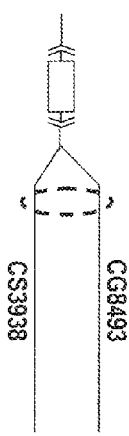
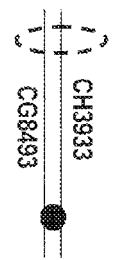
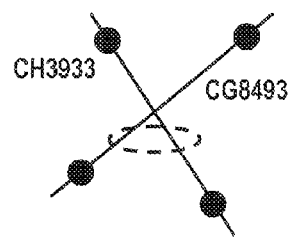
FIG. 3E  FIG. 3F  FIG. 3G

METHOD AND APPARATUS FOR PROCESSING POWER SYSTEM TOPOLOGY STRUCTURE INFORMATION

CROSS-REFERENCE TO RELATED APPLICATION(S)

This application claims foreign priority to P.R. China Patent application 200910211382.1 filed 30 Oct. 2009, the complete disclosure of which is expressly incorporated herein by reference in its entirety for all purposes.

FIELD OF THE INVENTION

The present invention relates to the field of information processing, and more particularly, relates to a method and an apparatus for processing power system topology structure information.

BACKGROUND OF THE INVENTION

A complex power system includes various kinds of devices, and a line per se may also be regarded as a device. A variety of factors may cause device outage, the most typical of which is device failure. Device outage affects power supply of power unit. Device failure-incurred device outage is unpredictable, which is adverse to taking redemptive measures to the effect of outage. One way to reduce this unpredictable outage is to maintain the device. A device with proper maintenance has a longer service life and a lower failure rate than one that is ill maintained or not maintained at all. Though device maintenance per se will also cause device outage, such outage is predictable and helps take redemptive measures in advance to the effect of outage. Due to features of power system, outage of a device may trigger chain outage of more other devices. For example, if the outage device is a sole power source device of another device, then the another device will be in outage accordingly. For another example, since a live device cannot be maintained, when maintaining a device, besides the device per se which needs to be in outage, a respective power source device for the device is also required to be in outage.

In order to reduce the impact of device outage to the power unit, a direct method is to set backup. For example, an important power unit, for example a medical apparatus or a scientific research instrument, always has two sets of power supply systems, where when one set of system cannot continue power supply due to device outage, the other set of system takes the responsibility for power supply. However, due to the huge amount of devices included in a power system, it is impossible to set backup for each device.

SUMMARY OF THE INVENTION

Principles of the invention provide techniques for processing power system topology structure information.

In one aspect, an exemplary method includes acquiring a topology structure of the power system; identifying at least one unification set in the power system based on the topology structure, wherein devices belonging to the same unification set have the same outage state; and recording the at least one unification set so as to concurrently maintain devices belonging to the same unification set.

In another aspect, an exemplary apparatus includes acquiring means configured to acquire a topology structure of the power system; identifying means configured to identify at least one unification set in the power system based on the topology structure, wherein devices belonging to the same unification set have the same outage state; and a recording module configured to record the at least one unification set so as to concurrently maintain devices belonging to the same unification set.

Techniques of the present invention can provide substantial beneficial technical effects. For example, in one or more embodiments, a unification set in a power system is identified, and devices belonging to the same unification set have the same outage state. If these devices belonging to the same unification set are maintained at different times, then each time each device is maintained, all devices in the unification set will experience an outage. However, in one or more exemplary embodiments, these devices are scheduled to be concurrently maintained, such that all of these devices only experience outage once, thereby avoiding the circumstance of numerous outages caused by mutual interferences of devices belonging to the same unification set.

These and other features and advantages of the present invention will become apparent from the following detailed description of illustrative embodiments thereof, which is to be read in connection with the accompanying drawings.

BRIEF DESCRIPTION OF THE DRAWINGS

FIGS. 3A-3G show a typical unification set.

DETAILED DESCRIPTION OF PREFERRED EMBODIMENTS

One or more embodiments advantageously reduce the impact of device outage incurred by device maintenance to power supply from the level of power system without setting backup.

Hereinafter, embodiments of the present invention will be described with reference to the accompanying drawings. In the following description, many specific details are illustrated so as to understand the present invention more comprehensively. However, the skilled in the art would appreciate that implementation of the present invention may not have some of these specific details, and the present invention is not limited to the particular embodiments as introduced. On the contrary, arbitrary combination of the following features and elements may be considered to implement the present invention, regardless of whether they relate to different embodiments or not. Thus, the following aspects, features, embodiments and advantages are only for illustrative purpose, and should not be regarded as elements or limitations of the appended claims, unless otherwise explicitly specified in the claims. It should be further noted that in order to prevent the present invention to be blurred due to unnecessary details, only apparatus structures and/or processing steps closely related to the solution according to the present invention are shown in the accompanying drawings, while other details having little relation with the present invention are omitted. Additionally, unless deliberately limited with "direct" or "indirect", the term "connection" in the present application documents includes both direct connection and indirect connection.

As previously mentioned, a power system comprises many devices. Most of these devices may experience maintenance. In the present application documents, the term "maintenance" includes all operations to a neutral device, such as mounting, checking, and repairing. A device is not isolated in a power system, thus during the process of maintaining a device, not only this device is in outage, but also some other devices may typically be in outages as a result. In the following description, unless otherwise specially noted, "outage" refers to outage caused by device maintenance. According to a solution of an embodiment of the present invention, based on power system topology structure information, at least two devices which influence mutually are identified from the power system topology, and then maintenance to the two devices are performed concurrently. Thus, the number of device outages will be reduced, and impact of device maintenance to power supply is reduced from the perspective of the whole power network. The skilled in the art would easily understand that concurrent maintenance to the two devices as mentioned here does not strictly means simultaneous start or simultaneous end of the maintenance to the two devices, but broadly means that maintenance to the two devices overlaps in time.

Figure 1:
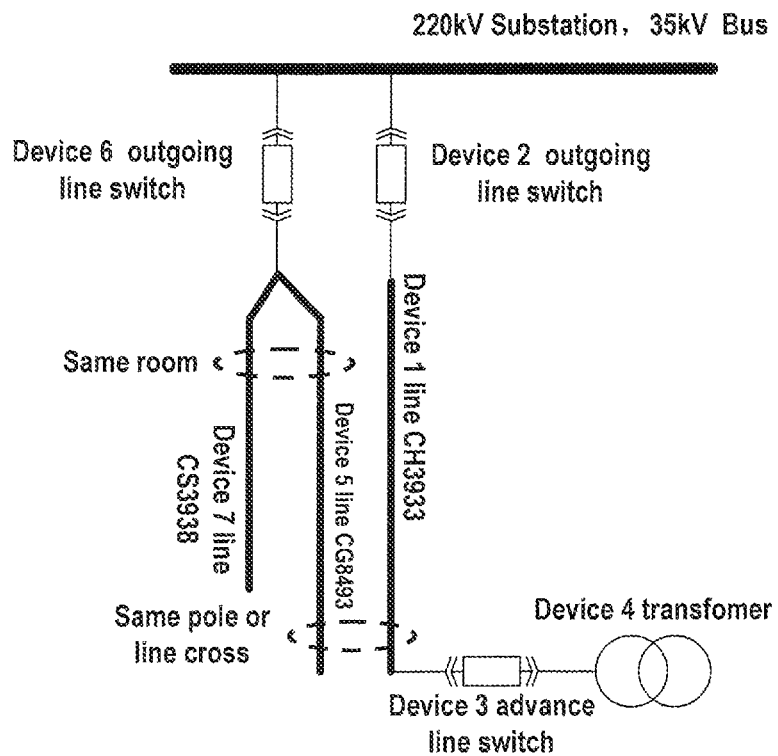
FIG. 1 shows an exemplary scenario of outage of a device triggering outage of other device.

FIG. 1 shows an exemplary scenario of outage of a device triggering outage of other device.

As shown in FIG. 1, if device 1 line CH3933 is to be checked, then line CH3933 need to be in outage. As previously mentioned, a line per se is also regarded as a device. Since the device cannot be electrified during the checking period, it is necessary to disconnect the line CH3933 from the 220 KV substation which supplies power to the line. As a result, a device 2 outgoing line switch as a power source device of the line CH3933 also needs to be in outage. Additionally, outage of line CH3933 results in outage of a device 3 advance wire switch with the line as its sole power source device, and the device 3 advance wire switch is a load device for the line CH3933; outage of the device 3 advance wire switch further results in outage of device 4 transformer with the line as its sole power source device, the device 4 transformer being load device of the device 3 advance wire switch.

Besides the above chain outages caused by power supply relations, outage of the line CH3933 may further cause outages of more of other devices through a layout relation. As shown in FIG. 1, device 5 line CG8493 and line CH3933 have a layout relation of "same pole" or "line cross", the former meaning two lines pass through at least one same power pole line pivot for example, while the latter meaning though the two lines do not pass through the same line pivot, they are crossed in space. For operating safety, when either of the line CG8493 and line CH3933 is subject to maintenance operation, the other one needs to be switched off. Thus, check of line CH3933 will result in outage of CG8493. Similar to the line CH3933, in order for outage of the line CG8493, the line CG8493 needs to be disconnected from the 220 kV substation which supplies power to the line, thus the device 6 outgoing line switch as the power source device of the line CG8493 need to be in outage. Finally, device 7 line CS3938 has a relation of "same room" with the line CG8493, i.e., their outgoing line switches are in the same compartment, it is shown in the Figure that they are connected to the same device 6 outgoing line switch, to indicate that while operating the outgoing line switch of the line CG8493, the outgoing line switch of the line CS3938 is also operated. Apparently, the device 7 line CS3938 is also in outage.

It is seen that check of device 1 line CH3933 results in outages of 7 devices. It should be noted that even in the simple system as shown in FIG. 1, the actual influence relation is not limited to the above depiction. In other words, it is not the case that check of any one of the 7 devices will influence the other 6 devices. For example, as mentioned above, check of line CH3933 will result in outage of device 3 advance wire switch; in turn, check of device 3 advance wire switch will also result in outage of the line CH3933. What is different is that check of line CH3933 will result in outage of the device 4 transformer, while in turn, check of the device 4 transformer will not result in outage of the line CH3933. A practical power system is more complex than the example of FIG. 1. The complexity is not only embodied by huge amount of devices in a practical power system, but also embodied by labyrinthic relations between devices in a practical power system.

Figure 2:
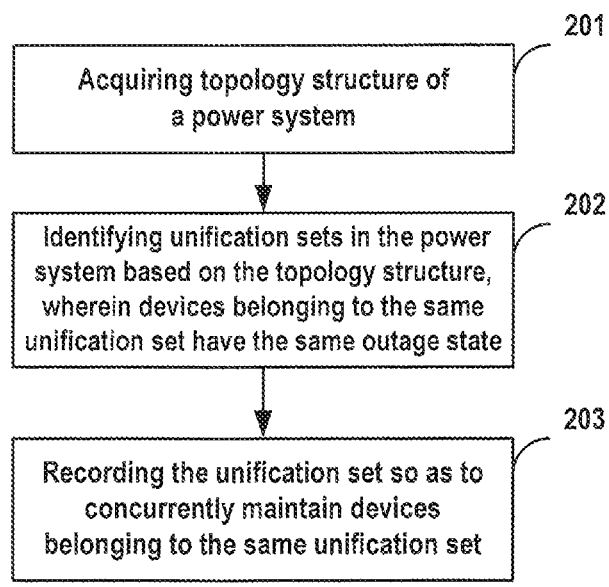
FIG. 2 shows a flow chart of a method for processing power system topology structure information according to an embodiment of the present invention.

FIG. 2 shows a flow chart of a method for processing power system topology structure information according to an embodiment of the present invention. As shown in FIG. 2, the exemplary method comprises steps 201-203.

Step 201, where a Power System Topology Structure is Acquired

A power system topology structure refers to respective devices in a power system and their connection relations. Various kinds of technologies may be adopted to express a power system topology structure with an electronic document. For example, the whole power system is expressed with "graph" in a data structure. Respective devices in the system are "vertexes" of the graph, and connections between devices are "edges" of the graph. As previously mentioned, a line is also a device, thus it is indicated as "vertex" in the figure, not edge. By setting properties for respective vertexes, the respective vertexes may indicate different devices. The skilled in the art know how to indicate a graph through data structures such as adjacency matrix or adjacency table, thereby indicating a practical power system topology structure. Of course, the skilled in the art may further employ many other means to indicate a topology structure of a power system. Thus, acquiring a topology structure of a power system refers to acquiring a set of data structure indicating the power system.

Step 202, where a Unification Set in the System is Identified Based on the Topology Structure A unification set refers to such a set, devices in which have the same outage state under any situation, i.e., if a device in a unification set is in a outage state, then other devices in the unification set are all in the outage state, and vice versa. FIGS. 3A-3G show some typical unification sets. In FIG. 3A, reference sign d1 denotes a capacitor, reference signs d2 and d4 denote switch blades, reference sign d3 denotes a breaker, and combination of two switch blades and a breaker forms a switch. The four devices have the same outage state in the power system. In FIGS. 3B-3D, devices other than the switch are a three winding transformer, a two winding transformer, and a bus, respectively. FIGS. 3E-3G show lines having relations of same room, same pole, and line cross. As previously mentioned, line per se is a device, and at least two lines having any one of these three kinds of relations also have the same outage state. Thus, at least two lines having any one of these three relations belong to the same unification set.

The topology structure of the power system has been acquired in step 201, while a unification set in the power system is fundamentally determined by the topology structure of the power system. Thus, by traversing respective devices in the power system, each unification set in the power system may be identified. In the case of indicating a power system topology structure with a graph, the skilled in the art may traverse the graph through techniques such as depth-first traversal and breadth-first traverse. Techniques for identifying respective unification set(s) through traversing respective devices in the power system will be described in more detail.

Step 203, where the Unification Set is Recorded so as to Concurrently Maintain Devices Belonging to the Same Unification Set As previously mentioned, devices belonging to the same unification set have the same outage state. If it is necessary to maintain a plurality of devices in a unification set, then these devices are scheduled to be concurrently maintained. Suppose there are two devices in a unification set, respectively, device A and device B, and that it is necessary to maintain device A and device B, respectively. If the two devices are not maintained concurrently, then when device A is being maintained, both device A and device B are required to be in outage simultaneously; and when device B is being maintained, both device A and device B are required to be in outage simultaneously. In other words, both device A and device B have to be in outages twice. If the two devices are maintained concurrently, then both device A and device B only need one outage. Device A and device B may have their own power units, and their outage may further affect other devices. Thus, when outage is reduced by one time, its impact on the power units and other devices is reduced accordingly.

It should be noted here that though both device A and device B belong to the same unification set, it does not mean that the device A and device B need to be maintained simultaneously for each time. It is because device A and device B may be different devices with different maintenance periods. Thus, in step 203, maintenance to device A and device B is only concurrently performed when both device A and device B need maintenance. Further, as previously mentioned, concurrent maintenance to the two devices refers broadly to maintenance of the two devices overlapping in time. Of course, if the time required for maintaining device A is longer than for maintaining device B, then more preferably, maintenance to device B is not earlier than start of maintenance to device A, and maintenance to device B is not later than end of maintenance to device A. In doing this, the total time required for maintaining device A and device B is equal to the time required for maintaining device A. Apparently, in the scenario that a great number of devices belonging to the same unification set, concurrently maintaining the great number of devices does not mean that any maintenance of every two devices overlaps in time.

The skilled in the art would easily understand that "recording" herein includes recording information regarding a unification set on any storage medium, and also includes directly outputting the information regarding the unification set for concurrently maintaining the devices belonging to the same unification set.

Figure 4:
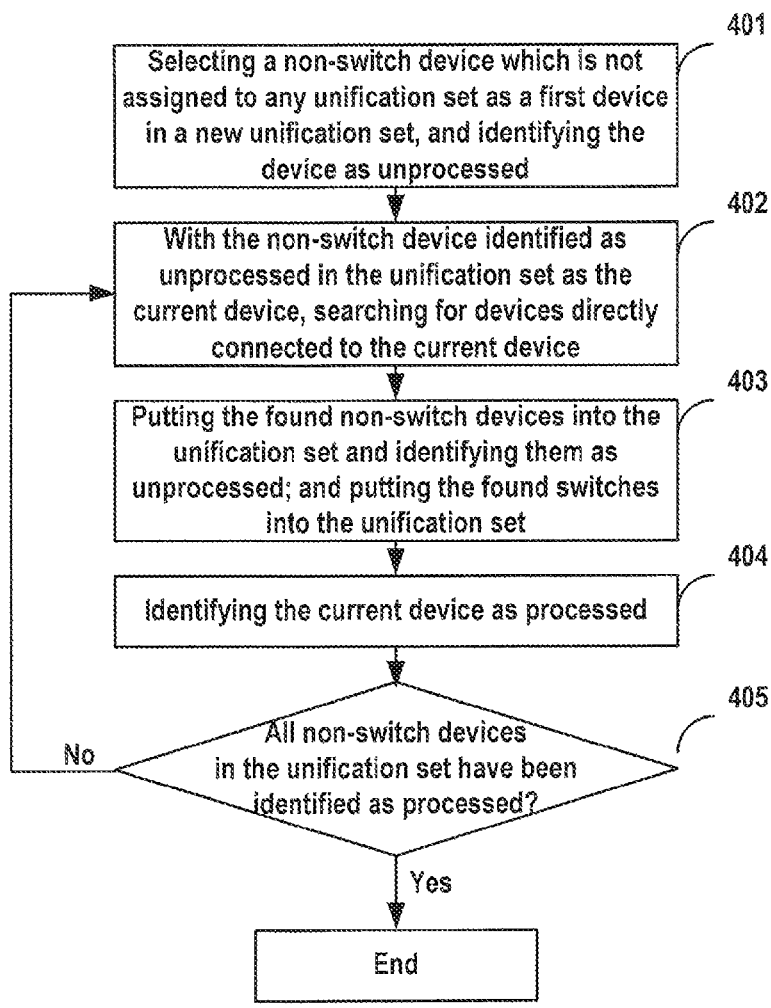
FIG. 4 shows a flow chart of a method for identifying a unification set through a power system topology structure according to an embodiment of the present invention.

Hereinafter, a method of identifying a unification set through a power system topology structure according to an embodiment of the present invention will be described in detail with reference to FIG. 4. It should be noted that what is shown in FIG. 4 is only a specific method for identifying a unification set. Under the teaching of FIG. 4, the skilled in the art can readily contemplate other methods of identifying a unification set.

In step 401, a non-switch device which is not assigned to any unification set is selected as a first device in a new unification set, and the device is identified as unprocessed.

Each device in a unification set has the same outage state, while a device in a unification set does not necessarily have the same outage state with a device in another unification set. In other words, a device cannot belong to two unification sets simultaneously. Thus, a first device in a new unification set must be a device not assigned to any unification set yet. Suppose the new unification set is a current unification set.

Theoretically, the selected device may be any device not assigned to any unification set in a power system. More preferably, a transformer, a bus, or a line in a power system may be selected as a first device. It is because a transformer, a bus, or a line is a core device in a power system, and with such core device as a start, it is likely to identify a unification set where the device is located more quickly. Such search policy is called center search policy.

A switch plays a role of disconnecting devices at two sides of the switch. Unless a device at one side of the switch is the only power source device of the switch device, while the switch device is the only power source device of the device at the other side thereof, the devices at two sides of the switch are not always in the same outage state, i.e., they belong to different unification sets. Therefore, features of the power system determine that the switch device is a border device of unification sets. Here, a border refers to a directly connected to other devices. Some non-switch devices in a unification set might not be directly connected to other devices, thus these non-switch devices are not border devices herein. The skilled in the art would understand, a switch device refers to any device which may switch on or off a connection between devices at its two sides as required.

Since a switch device is a border device, a processing method with the switch device as a first device of a unification set is different from a processing method with other device as the first device. If a switch device is the first device, then before step 402, non-switch devices directly connected to the switch device are searched for first, to put one of non-switch devices which have not been previously assigned to any unification set into the current unification set, and the device is identified as unprocessed. The reason why only one of the non-switch devices directly connected to the switch device is put into the current unification set is that the non-switch devices directly connected to the switch device always belong to different unification sets, thus into a unification set, only one of the non-switch devices directly connected to the switch device is put. Such search policy is called border search policy, which may also facilitate identification of a unification set.

In step 402, with a non-switch device identified as unprocessed in the current unification set as the current device, devices directly connected to the current device are searched for.

The switch device is a border device of the unification set. Non-switch devices directly connected to the switch device may belong to different unification sets. Thus, in step 402, only devices directly connected to the non-switch devices are searched for.

In step 403, the found non-switch devices are put into the current unification set and identified as unprocessed; and the found switches are put into the unification set.

As previously mentioned, a non-switch device cannot belong to two unification sets simultaneously, and the border device of the unification set is the switch device. If it is found that a non-switch device is directly connected to the current device, since the current device is also a non-switch device, then this found non-switch device should be in the same unification set with the current device and is not the border device of the current unification set either. Thus, the found non-switch devices are put into the current unification set and identified as unprocessed.

If a switch device is found in step 402, then the switch device is put into the current unification set in step 403. The switch device constitutes a border device of the current unification set. It may be appreciated that a switch device may belong to a plurality of unification sets simultaneously.

In step 404, the current device is identified as processed. In previous steps 402-403, all devices directly connected to the current device have been searched for, including switch devices and non-switch devices, and all found devices are put into the current unification set. In doing this, the current device has been processed in the process of identifying the current unification set.

In step 405, whether all non-switch devices have been identified as processed is determined. If so, it indicates that such a set all of whose border devices are switch devices has been found, i.e., a unification set has been found. If there are still unprocessed non-switch devices, then return to step 402 to proceed with these unprocessed non-switch devices. Note also the unnumbered END block.

Actually, the above method is taking any one of non-switch devices which have not been assigned to any unification set as a start of a new unification set to search for devices connected to the non-switch devices as devices in the new unification set, till all border devices of the new unification sets are switch devices. The skilled in the art may design other specific methods to identify unification sets. Apparently, connection here includes direct connection and indirect connection. The non-switch devices may be preferably a transformer, a bus, a line, or a non-switch device directly connected to a switch. The above steps are repeated till all devices in the power system are assigned to a certain unification set, thereby all unification sets in the power system may be identified.

In the above found unification sets, devices belonging to the same set have the same outage state. However, complexity of a power system may result in that some devices which can form a unification set solely are not identified, or the identified unification sets are incomplete. An example for the latter scenario is a unification set with a power supply relation.

A power supply relation cannot be identified from a power supply topology structure per se, i.e., it is impossible to identify whether two connected devices have a power supply relation and which device in the two devices having a power supply relation is the power source supply, and it is even impossible to identify whether a device is the only power source device of another device. As previously mentioned, if a device is the only power source device of another device, then the two devices must have the same outage state. In view of unification set, the situation is more complex. If unification set A is the only power source of unification set B, then outage of unification set A will cause outage of unification set B, while in turn, outage of unification set B will not cause outage of unification set A. It is because there is a switch device between the two unification sets as a border device. Likewise, it is impossible to identify whether two adjacent unification sets have power supply relation from the topology structure per se and which unification set in the two unification sets having a power supply relation is the power supply, and it is even impossible to identify whether a unification set is the only power source of another unification set. Here, "adjacent" means two unification sets commonly include at least one switch device.

Identification of unification sets may be further improved through analyzing historical outage data of the power system so as to decrease occurrence of the above circumstances. Historical outage data records outages that actually happened in the power system. For example if outage state of a device M is independent from outage states of devices directly connected to the device M, i.e., upon outage of the device M, the devices directly connected thereto are always not in outage, or upon outages of the devices directly connected the device M, the device M is always not in outage, then this device M always forms a unification set on its own. Studies show that this situation most likely occurs to a switch device, i.e., it is put into a unification set during the process of identifying a unification set through a topology structure, however, actually it forms by itself a unification set and may be in outage individually. For another example, if the number of simultaneous outage of unification set A and unification set B is greater than the number of individual outage of unification set A while smaller than the number of individual outage of unification set B, then it is quite likely that unification set A is the power source of unification B, or unification set B is the load of unification set A. The greater the difference between the number, the higher the possibility is. After determining that the unification set A is the only power source of unification B, a mergence of unification set A and unification set B may be taken as a new unification set, while not retaining the unification set A any longer. The skilled in the art may easily conceive that other statistical methods may be used to improve the identification of unification sets.

Generally, unless the topology structure of a power system changes, the identification of unification sets is once for all, i.e., the identified unification sets may be stored for repetitive use. For each time in use, information of unification sets is loaded as an input, and information of to-be-executed maintenance is loaded as another input, and then maintenance to devices in the same unification set is performed concurrently. How to determine a to-be-executed maintenance is known in the art, which will not be detailed here.

Figure 5:
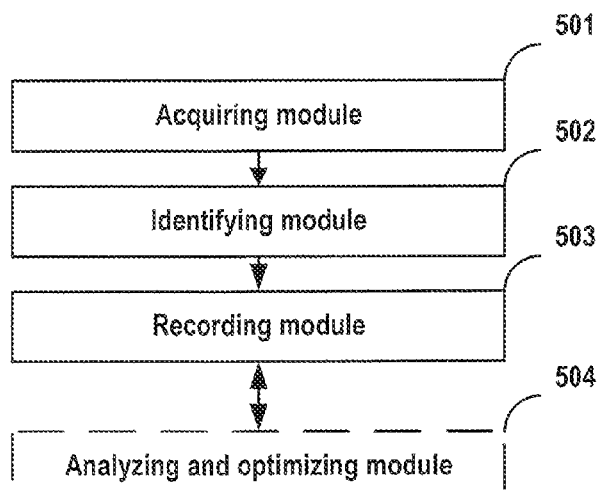
FIG. 5 shows a block diagram of an apparatus for processing power system topology structure information according to an embodiment of the present invention.

FIG. 5 shows a block diagram of an apparatus for processing power system topology structure information according to an embodiment of the present invention.

An acquiring module 501 is configured to acquire a topology structure of a power system.

An identifying module 502 is configured to identify at least one unification set in the power system based on the topology structure, wherein devices belonging to the same unification set have the same outage state.

A recording module 503 is configured to record the at least one unification set so as to concurrently maintain devices belonging to the same unification set.

As previously mentioned, alternatively, this apparatus may further comprises an analyzing and optimizing module 504 configured to analyze historical outage data so as to improve identification of unification sets.

The normally skilled in the art may understand that the above method and system may be implemented with a computer-executable instruction and/or by included in a processor control code, for example, such code is provided on a bearer medium such as a magnetic disk, CD, or DVD-ROM, or a programmable memory such as a read-only memory (firmware) or a data bearer such as an optical or electronic signal bearer. The system and its components for controlling energy consumption of a mobile device in the present embodiment may be implemented by a hardware circuitry, such as a very large scale integrated circuit or gate array, a semiconductor such as a logical chip or transistor, or a programmable hardware device, such as a field-programmable gate array, or a programmable logical device, or implemented by software executable by various kinds of processors, or implemented by combination of the above hardware circuitry and software, such as firmware.

Thus, having reviewed the disclosure herein, the skilled artisan will appreciate that aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Distinct software modules for carrying aspects of embodiments of the invention can be, in at least some cases, embodied on a computer readable storage medium The means mentioned herein can include (i) hardware module(s), (ii) software module(s), or (iii) a combination of hardware and software modules; any of (i)-(iii) implement the specific techniques set forth herein, and the software modules are stored in a computer readable medium (or multiple such media).

Though a plurality of exemplary embodiments of the present invention have been illustrated and depicted, the skilled in the art would appreciate that without departing from the principle and spirit of the present invention, changes may be made to these embodiments, and the scope of the present invention is limited by the appending claims and equivalent variations thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method embodied in computer readable program code stored on computer readable medium and executed by an instruction execution system for processing topology structure information of a power system, the method comprising:
   acquiring the topology structure of the power system;
   identifying at least one unification set in the power system based on the topology structure, wherein devices simultaneously belonging to a same unification set necessarily have a same outage state; and
   recording the at least one unification set so as to concurrently maintain devices belonging to the same unification set,
   wherein identifying at least one unification set in the power system comprises:
   assigning a next non-switch device which has not been assigned to any unification set and which is identified as unprocessed to a new unification set; and
   identifying devices connected to the next non-switch device as belonging to the new unification set,
   wherein a non-switch device among the devices identified as connected to the next non-switch device is identified as unprocessed, and
   wherein the assignment of next non-switch devices and the identification devices connected to the next non-switch devices is performed iteratively until all non-switch devices are identified as processed.

2. The method according to claim 1, wherein the next non-switch device is a transformer device.

3. The method according to claim 1, wherein the next non-switch device is a bus device.

4. The method according to claim 1, wherein the next non-switch device is a line device.

5. The method according to claim 1, further comprising: analyzing historical outage data.

6. The method according to claim 5, wherein analyzing historical outage data comprises:
   determining that the historical outage data shows that an outage state of a target device is independent from outage states of corresponding devices directly connected to the target device; and
   assigning the target device to a unification set of its own.

7. The method according to claim 5, wherein analyzing historical outage data comprises:
   identifying a power source unification set and a load unification set, which are in a power supply relation, based on the historical outage data; and
   adding devices belonging to the load unification set into the power source unification set upon determining that the historical outage data further shows that the power source unification set is a sole power supply of the load unification set.

8. A computer program product embodied in a non-transitory computer readable medium having computer readable program code embodied thereon for processing topology structure information of a power system, the computer readable program code comprising:

an acquiring module configured to acquire the topology structure of the power system;

an identifying module configured to identify at least one unification set in the power system based on the topology structure, wherein devices simultaneously belonging to a same unification set necessarily have a same outage state; and a recording module configured to record the at least one unification set, wherein a plurality of devices belonging to the same unification set are scheduled for concurrent maintenance, wherein the identifying module comprises:

a module configured to assign a next non-switch device which has not been assigned to any unification set and which is identified as unprocessed to a new unification set a module configured to identify devices connected to the next non-switch device as belonging to the new unification set, wherein a non-switch device among the devices identified as connected to the next non-switch device is identified as unprocessed, and wherein the assignment of next non-switch devices and the identification devices connected to the next non-switch devices is performed iteratively until all non-switch devices are identified as processed.

9. The computer program product according to claim 8, wherein the next non-switch device is a transformer device.

10. The computer program product according to claim 8, wherein the next non-switch device is a bus device.

11. The computer program product according to claim 8, wherein the next non-switch device is a line device.

12. The computer program product according to claim 8, further comprising selecting the next non-switch device from among devices connected to a switch device.

13. The computer program product according to claim 8, further comprising: an analyzing and optimizing module configured to analyze historical outage data.

14. The computer program product according to claim 13, wherein the analyzing and optimizing module comprises: a module configured to to determine that the historical outage data shows that an outage state of a target device is independent from outage states of corresponding devices directly connected to the target device, and to assign the target device to a unification set of its own.

15. The computer program product according to claim 13, wherein the analyzing and optimizing module comprises:

a module configured to identify a power source unification set and a load unification set, which are in a power supply relation, based on historical outage data; and a module configured to determine that the historical outage data further shows that the power source unification set is a sole power supply of the load unification set, and add devices belonging to the load unification set into the power source unification set.

16. The computer program product according to claim 8, further comprising scheduling the concurrent maintenance for the plurality of devices according to an input specifying a one or more devices belonging to the same unification set to be maintained, wherein the plurality of devices includes at least one additional device as compared to the one or more devices.

17. A method embodied in computer readable program code stored on computer readable medium and executed by an instruction execution system for processing topology structure information of a power system, the method comprising:

acquiring the topology structure of the power system;

identifying at least one unification set in the power system based on the topology structure, wherein devices simultaneously belonging to a same unification set necessarily have a same outage state; and recording the at least one unification set so as to concurrently maintain devices belonging to the same unification set, wherein identifying at least one unification set in the power system comprises:

searching, iteratively, the topology structure of the power system for devices, wherein the searching comprises:

identifying a next non-switch device that is not assigned to any unification set and which is identified as unprocessed;

assigning the next non-switch device to a new unification set; and identifying each non-switch device and each switch device connected to the next non-switch device as belonging to the new unification set, wherein each non-switch device identified as connected to the next non-switch device is identified as unprocessed.

* * * * *